(12) United States Patent
Godøy (10) Patent No.: US 10,921,474 B2
(45) Date of Patent: Feb. 16, 2021

(54) OBTAINING SEISMIC DATA IN AREAS COVERED WITH ICE

(71) Applicants: POLARCUS DMCC, Dubai (AE); Erik Godøy, Nesbru (NO)

(72) Inventor: Erik Godøy, Nesbru (NO)

(73) Assignee: POLARCUS DMCC, Dubai (AE)

(*) Notice: Subject to any disclaimer, the term of this patent is extended or adjusted under 35 U.S.C. 154(b) by 149 days.

(21) Appl. No.: 15/311,208

(22) PCT Filed: May 7, 2015

(86) PCT No.: PCT/NO2015/050075
§ 371 (c)(1),
(2) Date: Nov. 15, 2016

(87) PCT Pub. No.: WO2015/174848
PCT Pub. Date: Nov. 19, 2015

(65) Prior Publication Data
US 2017/0075012 A1    Mar. 16, 2017

(30) Foreign Application Priority Data
May 15, 2014  (NO) .................................. 20140623

(51) Int. Cl.
*G01V 1/38* (2006.01)
*B63B 21/66* (2006.01)
*G01V 1/20* (2006.01)

(52) U.S. Cl.
CPC .......... *G01V 1/3826* (2013.01); *B63B 21/663* (2013.01); *G01V 1/201* (2013.01);
(Continued)

(58) Field of Classification Search
CPC ...... B63B 21/663; G01V 1/38; G01V 1/3826; G01V 1/3843
See application file for complete search history.

(56) References Cited

U.S. PATENT DOCUMENTS 3,434,451 A * 3/1969 Brainard .............. G01V 1/3826
                                                114/244
3,469,551 A    9/1969 Lefebvre
(Continued)

OTHER PUBLICATIONS

Written Opinion issued in parent international application No. PCT/NO2015/050075, dated Jul. 28, 2015, pp. 1-5.
(Continued)

*Primary Examiner* — Krystine E Breier
(74) *Attorney, Agent, or Firm* — Jeffrey S. Melcher; Melcher Patent Law PLLC (57) ABSTRACT

The invention relates to a seismic streamer (1) for underwater towing at a towing speed in ice-free or wholly or partially icy water, the streamer (1) is provided with birds (2) spaced along the streamer, the streamer including the birds (2) has negative buoyancy, the birds have wings (8) which can be set so that the birds during movement in the water apply an upward or downward force on the streamer. The streamer (1) is provided with buoyant bodies (4) spaced along the streamer, the buoyant bodies are connected to the streamer by spacer elements (5), the streamer including the birds, the buoyant bodies with associated spacer elements and any other equipment together have positive buoyancy. The invention also relates to a corresponding method for securing a seismic streamer (1) from damage at a substantial reduction or cessation of towing speed when towing underwater in ice-free or wholly or partially icy water.

14 Claims, 6 Drawing Sheets

(52) U.S. Cl.
CPC .......... *G01V 1/3808* (2013.01); *G01V 1/3843* (2013.01); *G01V 2001/207* (2013.01)

(56) References Cited

U.S. PATENT DOCUMENTS

| | | | | |
|---|---|---|---|---|
| 4,075,967 | A | * | 2/1978 | Silvey .................. B63B 21/663 |
| | | | | 114/243 |
| 5,157,636 | A | | 10/1992 | Bjerbkoy |
| 6,016,286 | A | * | 1/2000 | Olivier ................. G01V 1/3826 |
| | | | | 367/17 |
| 8,570,829 | B2 | * | 10/2013 | Hovland ............. G01V 1/3861 |
| | | | | 367/16 |
| 8,593,905 | B2 | * | 11/2013 | Gagliardi ................ B63B 35/08 |
| | | | | 367/20 |
| 9,341,730 | B2 | * | 5/2016 | Wu ........................ B63B 22/18 |
| 9,535,182 | B2 | * | 1/2017 | Gagliardi ............... B63B 21/66 |
| 9,933,536 | B2 | * | 4/2018 | Gagliardi ............. G01V 1/3808 |
| 2009/0092004 | A1 | * | 4/2009 | Toennessen ........... B63B 21/66 |
| | | | | 367/17 |

OTHER PUBLICATIONS

International Search Report issued in parent international application No. PCT/NO2015/050075, dated Jul. 28, 2015, pp. 1-2.

* cited by examiner

OBTAINING SEISMIC DATA IN AREAS COVERED WITH ICE

The invention relates to a seismic streamer for underwater towing in ice-free or wholly or partially icy water, a use of the streamer and a method for securing a seismic streamer from damage at a substantial reduction or cessation of towing speed when towing underwater in ice-free or wholly or partially icy water.

It is known to tow streamers with hydrophones, accelerometers and other types of sensors in the ocean to obtain geological information about the seabed. Acoustic energy is emitted by a source, typically an air gun, reflected by the various geologic structures in the earth crust, and intercepted by the streamers.

The streamers and the acoustic source are usually towed by a towing vessel. The streamers are usually ballasted with ballast weights to approximately neutral buoyancy, usually slightly negative buoyancy. Intercepted signals from the streamers are transferred to the towing vessel for storage and possibly processing.

The depth of the streamers is controlled by depth control devices, so-called "birds", which are located along the streamers. A bird has wings which generate an upward or downward force due to movement through the water, and the birds can thus position the streamer to the desired depth. The force generated by a bird depends on a certain speed relative to the water, and the force therefore ceases at a substantial reduction or cessation of towing speed. A streamer with positive buoyancy will then rise and come to the surface, while a streamer with negative buoyancy will sink.

The streamers are destroyed by the hydrostatic pressure if they sink below a certain depth, typically 200-500 m, and streamers are therefore usually equipped with inflatable "rescue buoys", so-called "Streamer Recovery Devices," which are released if the streamer sinks deeper than a set depth, typically 30-50 m. If the "rescue buoys" have been released, the streamers must wholly or partially be taken up to replace the released "rescue buoys." For operations in ice-free water this is not considered a major problem, since depth control of the streamers relatively rarely is lost.

When operating in icy water there is usually an icebreaker which opens a channel in the ice in front of the towing vessel, or the icebreaker is used as towing vessel. The icebreaker may have to stop because of ice conditions or other circumstances. If the streamers are negatively ballasted and they are not equipped with "rescue buoys", they could sink and be destroyed by the pressure. If the streamers are positively ballasted they may rise to the surface, where they most likely will be damaged by the ice.

Both the probability of a stop in the towing and the risk of damage to the streamers at a stop in the towing is therefore larger when towing streamers in icy than in ice-free water.

U.S. Pat. No. 8,593,905 describes the collection of seismic data in icy water by a vessel fitted with a stern construction for deploying and maintaining seismic streamers underwater. Also described is a seismic source which is towed underwater, and which is connected to underwater buoyant bodies. It is further described a seismic streamer which is towed underwater, and which in its end is connected to a buoyant body which can float on the surface or be moved between the surface and a position underwater.

The object of the invention is to reduce or eliminate the above problems of damage to streamers when towing underwater in wholly or partially icy water. A further object of the invention is that it also can be used for towing of streamers underwater in ice-free water. Another object is to eliminate the need for "rescue buoys" when towing the streamers. Further objects and advantages of the invention will appear from the description. The objects are achieved by features specified in the description and claims.

The invention relates to a single seismic streamer and towing of the streamer underwater. How the streamer is towed and how many other streamers that are towed along with it is outside the invention. The collection of the seismic signals is also outside the invention.

In a first aspect the invention relates to a seismic streamer for underwater towing at a towing speed in ice-free or wholly or partially icy water. The streamer is provided with birds spaced along the streamer, the streamer including the birds has negative buoyancy, and the birds have wings which can be set so that the birds during movement in the water apply an upward or downward force on the streamer.

According to the invention the streamer is provided with buoyant bodies spaced along the streamer, the buoyant bodies are connected to the streamer by spacer elements, and the streamer including the birds, the buoyant bodies with associated spacer elements and any other equipment together have positive buoyancy.

When using the streamer, the birds are set, at the towing speed, to maintain the streamer at a selected depth; the birds apply a downward force on the streamer which compensates for the positive buoyancy. At a substantial reduction or cessation of towing speed, the downward force on the streamer from the birds ceases as a result of lack of movement in the water, and the streamer including the birds, the buoyant bodies with associated spacer elements and any other equipment, because of their positive buoyancy rise until the buoyant bodies reach an ice-free water surface or the underside of a wholly or partially icy water surface.

In a second aspect the invention relates to a method for securing a seismic streamer from damage at a substantial reduction or cessation of towing speed when towing underwater in ice-free or wholly or partially icy water. The streamer is provided with birds spaced along the streamer, the streamer including the birds has negative buoyancy, and the birds have wings which can be set so that the birds during movement in the water apply an upward or downward force on the streamer. The method of the invention comprises the following steps:

to provide the streamer with buoyant bodies spaced along the streamer, the buoyant bodies are connected to the streamer by spacer elements, such that the streamer including the birds, the buoyant bodies with associated spacer elements and any other equipment, together get positive buoyancy, and to set the birds, at the towing speed, to maintain the streamer at a selected depth, the birds apply a downward force on the streamer, which compensates for the positive buoyancy.

At a substantial reduction or cessation of towing speed, the downward force on the streamer from the birds ceases as a result of lack of movement in the water, and the streamer including the birds, the buoyant bodies with associated spacer elements and any other equipment, because of their positive buoyancy rise until the buoyant bodies reach an ice-free water surface or the underside of a wholly or partially icy water surface.

The invention implies that the streamers are ballasted to greater negative buoyancy than is usually used in ice-free water. The ballasting may be done using custom ballast weights that are mounted along the streamer.

"The rescue buoys"—so-called "Streamer Recovery Devices"—as previously described, are not used. Instead there are used buoyant bodies attached to the streamer by spacer elements. The buoyant bodies have a buoyancy that provides the streamer including all attached equipment with a positive buoyancy. This buoyancy can be calculated on the basis of known weight and displacement of the components as well as the density of the water in which the streamer is towed.

Under normal operation the streamers are towed through the water at a certain speed. The birds will then be set to provide a downward force that counteracts the positive buoyancy generated by the buoyant bodies, and that keeps the streamers at the desired depth.

The streamer will after the buoyant bodies have risen to the ice-free surface or the underside of the icy surface be hanging at a depth preselected by selecting the length of the spacer elements which connect the buoyant bodies with the streamer. To ensure that the buoyant bodies and the streamer actually rise towards the surface, the buoyant bodies, the spacer elements, the streamer, the birds and any other equipment that is mounted on the streamer, together must have a positive buoyancy of a certain size. Moreover, to ensure that the streamer is hanging under the buoyant bodies, the streamer with the birds and any other equipment must have negative buoyancy, while the buoyant bodies must have positive buoyancy. The spacer elements preferably have approximately neutral buoyancy, but may have positive or negative buoyancy, as long as the positive or negative buoyancy of the spacer elements is so small that it does not affect that the streamer hangs below the buoyant bodies.

The streamers contain very sensitive hydrophones and/or accelerometers. Any equipment that is attached to the streamers can create disturbances in the form of vibrations and acoustic noise. The buoyant bodies are therefore preferably designed with an optimized hydrodynamic shape that provides minimal drag and minimal acoustic noise. The spacer elements may for the same reason be equipped with external streamlined profiles—"foil fairing"—to reduce drag and vibrations that can generate noise. Foil fairing is known equipment, and can be delivered by a supplier of ropes for maritime use.

The invention will now be described in more detail with reference to the accompanying drawings, wherein.

Figure 1:
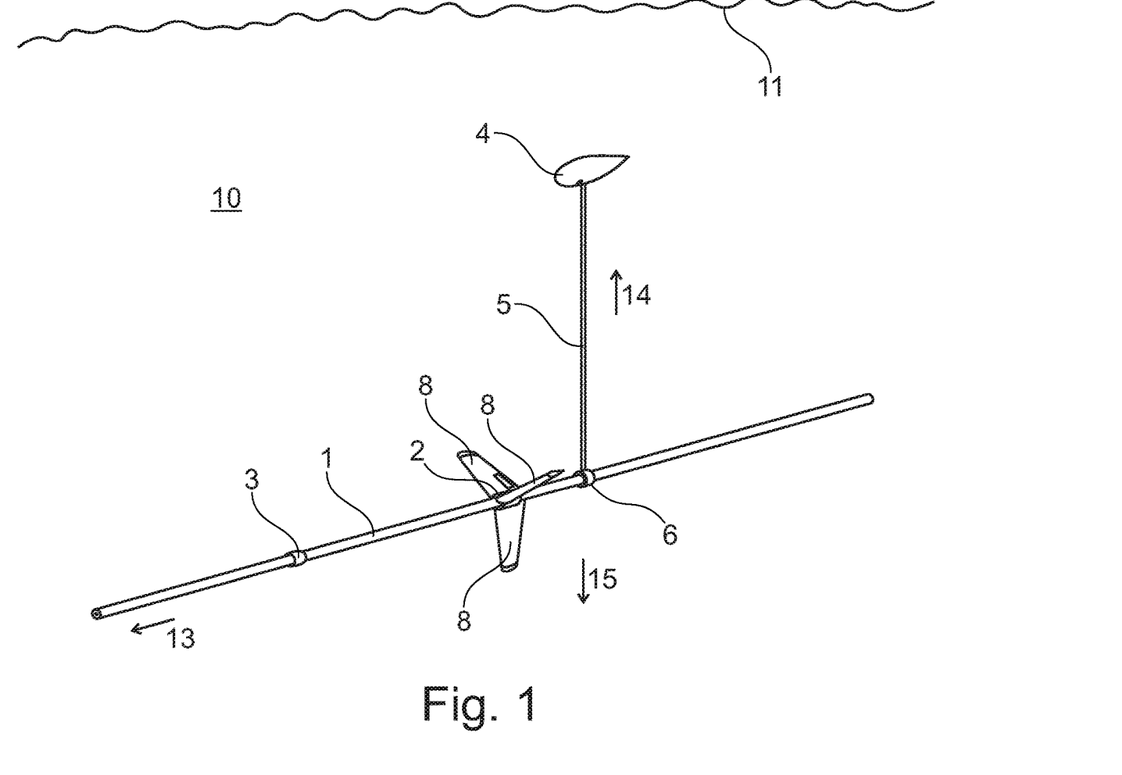
FIG. 1 shows a perspective view of a streamer according to the invention.

FIG. 1 shows a perspective view of a seismic streamer 1, which may be 3-12 km long, for towing underwater. The streamer 1 is located in water 10, under a water surface 11. The streamer 1 is towed by means not shown in a towing direction 13 at a towing speed which may be 3-5 knots. A bird 2 has steerable wings 8 with associated actuators which can be set, at relative motion between the water and bird, to produce a positive lift upward in direction 14 or a negative lift downward in direction 15. The positive or negative lift applies an upward or downward force, respectively, on the streamer. Several birds 2 are spaced along the streamer 1. Electric power and signals for operation and control of the birds' actuators are transferred through the streamer 1. By means of depth sensors and associated control automation, the birds' wings 8 can be set to maintain the birds 2, and thus the streamer 1, at a selected depth, typically 5-30 m under the water surface 11. The birds and everything that relates to them are prior art. The illustrated bird is an "eBird" from Kongsberg Seatex, Kongsberg, Norway.

The streamers including the weight of the birds have negative buoyancy. The negative buoyancy is obtained by ballasting of the streamer with ballast weights 3 spaced along the streamer.

The streamer 1 is provided with buoyant bodies 4, which have positive buoyancy and are positioned with a distance, typically 100-300 m, along the streamer. The buoyant bodies 4 are connected to the streamer 1 by spacer elements 5, which are attached to the streamer in attachment devices 6. The streamer 1 including the birds 2, the ballast weights 3, the buoyant bodies 4 with associated spacer elements 5 and any other not illustrated equipment together have positive buoyancy.

The buoyant bodies 4 have positive buoyancy and seek upward in direction 14. Since the streamer 1 including the weight of the birds 2 and the ballast weights 3 have negative buoyancy, the streamer seeks downward in direction 15. The streamer 1 therefore hangs under the buoyant bodies 4 in a distance corresponding to the length of the spacer elements 5. The spacer elements 5 have either approximately neutral buoyancy or so weak positive or negative buoyancy that they do not substantially affect that the streamer 1 hangs below the buoyant bodies 4.

Figure 2:
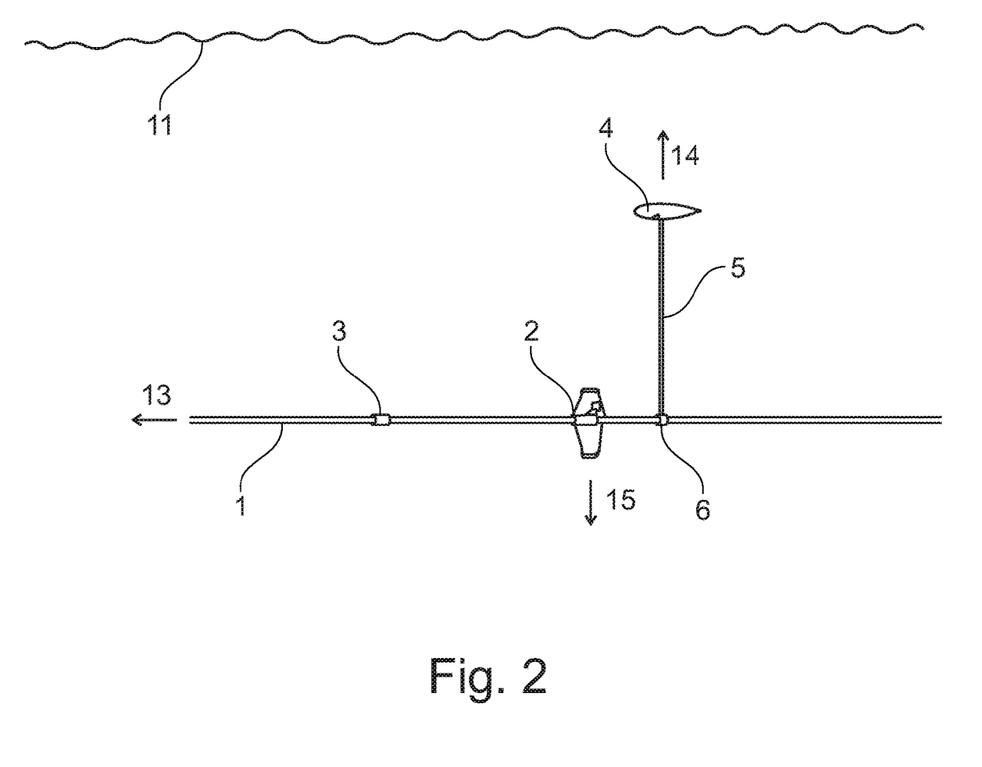
FIG. 2 shows a side view of the streamer being towed under an ice-free water surface.

FIG. 2 shows the streamer 1 as it is towed under an ice-free water surface 11. The birds 2 are set, at the towing speed, to maintain the streamer at a selected depth. Since the streamer 1 including the birds 2, the ballast weights 3, the buoyant bodies 4 with associated spacer elements 5 and any other not illustrated equipment together have positive buoyancy; the birds counteract this positive buoyancy by a downward force in direction 15. The downward force from the birds is, however, dependent on relative motion between the water and the birds, and this relative motion also must have a certain size.

At a substantial reduction or cessation of towing speed, the downward force on the streamer from the birds ceases as a result of lack of relative motion between the water and the birds. The streamer 1, including the birds 2, the ballast weights 3, the buoyant bodies 4 with associated spacer elements 5 and any other equipment, thereby, because of their positive buoyancy rise upward in direction 14.

Figure 3:
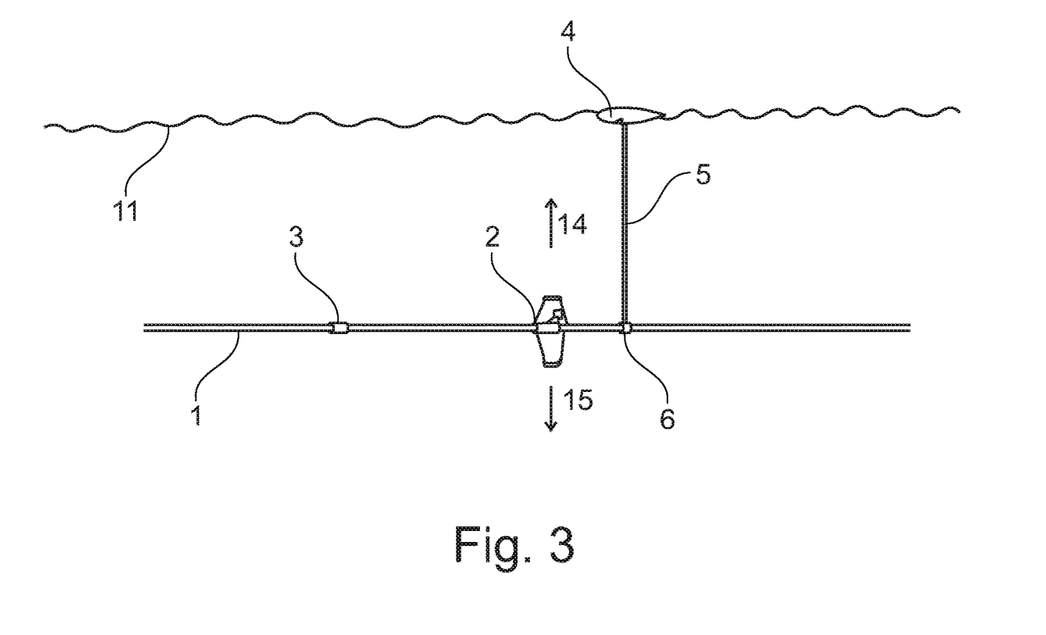
FIG. 3 shows a side view of the streamer with a buoyant body floating in the ice-free water surface.

FIG. 3 shows the streamer of FIG. 2 as it has risen until the buoyant bodies 4 have reached the ice-free water surface 11, and float in the water surface. Since the streamer 1 including the weight of the birds 2 and the ballast weights 3 have negative buoyancy, the streamer continues to seek downward in direction 15, and the streamer 1 therefore still hangs under the buoyant bodies 4 in a distance corresponding to the length of the spacer elements 5.

Figure 4:
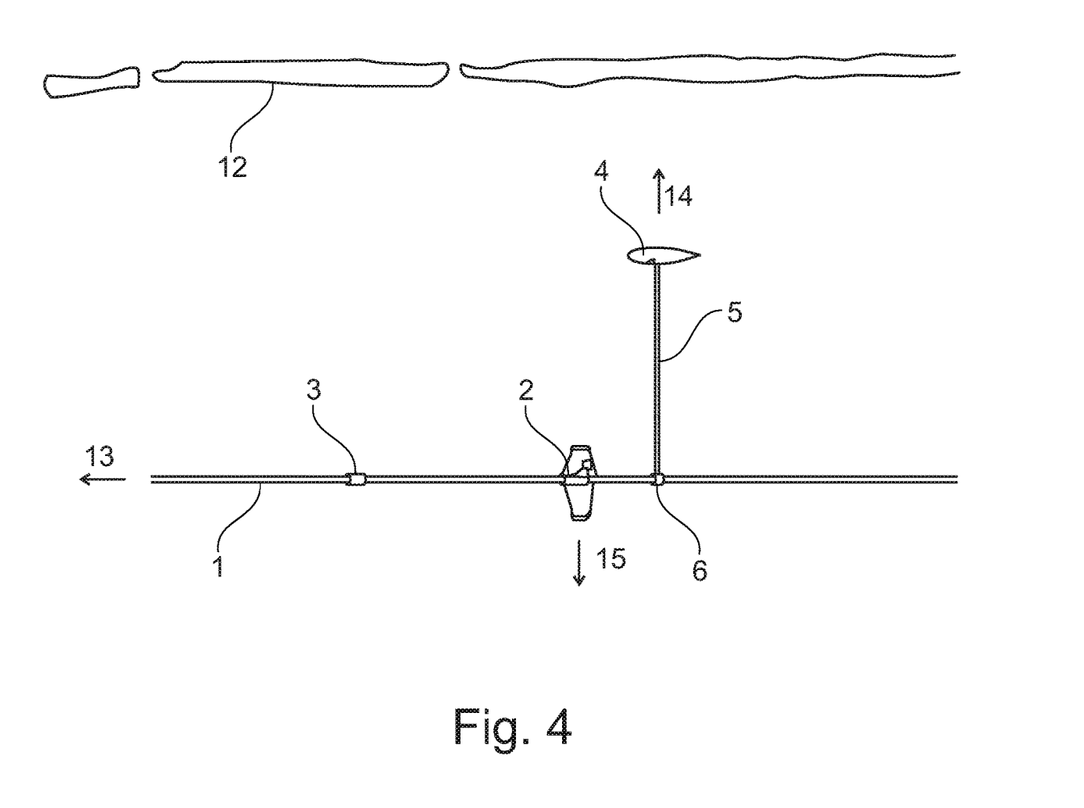
FIG. 4 shows a side view of the streamer being towed under an icy water surface.

FIG. 4 shows the streamer 1 as it is towed under an icy water surface 12. The streamer and its associated components are the same as in FIG. 2. As explained with reference to FIG. 2, at a substantial reduction or cessation of towing speed, the streamer 1, including the birds 2, the ballast weights 3, the buoyant bodies 4 with associated spacer elements 5 and any other equipment, rise upward in direction 14.

Figure 5:
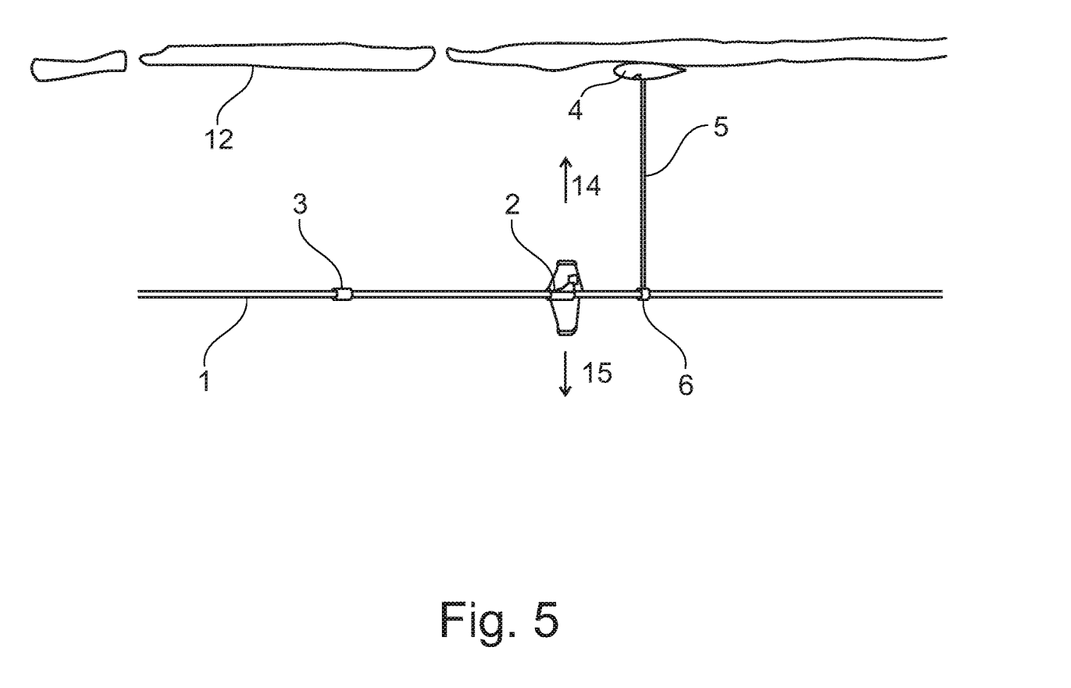
FIG. 5 shows a side view of the streamer with the buoyant body on the underside of the icy water surface.

FIG. 5 shows the streamer of FIG. 4 as it has risen until the buoyant bodies 4 have reached the underside of the icy water surface 12, and are located under the ice. As explained with reference to FIG. 3, the streamer 1 still hangs below the buoyant bodies 4 at a distance corresponding to the length of the spacer elements 5.

The icy water surface in FIGS. 4 and 5 is broken. When towing seismic streamers the water surface may be ice-free, partly icy or completely icy with whole or broken ice. When towing a streamer according to the invention, the streamer will, at a substantial reduction or cessation of towing speed, regardless of ice conditions, rise to a depth where it is located at a distance below the water surface corresponding to the length of the spacer elements 5.

A pre-calculated total buoyancy of the buoyant bodies is achieved by changing displacement or volume weight of the buoyant bodies and/or the distance between the buoyant bodies along the streamer. The buoyancy per buoyant body is typically 100 N.

Each bird may at the towing speed typically apply a downward force of 50 N, as a maximum the force may be in the range 200-500 N. By adjusting the number of or the distance between the ballast weights, buoyant bodies and birds, and the positive or negative buoyancy they apply on the streamer, it is firstly achieved that the streamer with all attached equipment has sufficient positive buoyancy to rise to the surface at substantial reduction or cessation of towing speed, and secondly that the streamer has sufficient negative buoyancy not to rise to the surface itself, but remain hanging under the buoyant bodies when they rise to the surface.

The length of the spacer elements is selected so that the streamer is hanging at a predetermined desired depth below the buoyant bodies after the buoyant bodies have ascended to the water surface or become lying under the ice. The spacer elements may typically be 2-6 m long.

The streamer contains very sensitive sensors, such as hydrophones, accelerometers and electromagnetic sensors. All equipment that is attached to the streamer can create disturbances in the form of vibrations and acoustic noise, and the buoyant bodies therefore have an optimized hydrodynamic shape that gives low drag and low acoustic noise.

Figure 6:
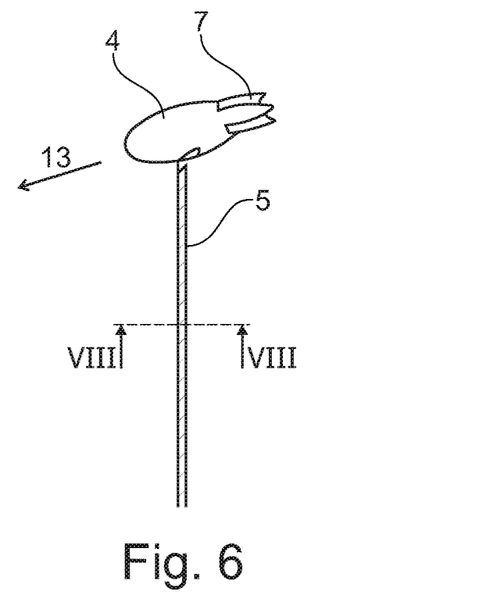
FIG. 6 shows the buoyant body with tail fins.

FIG. 6 shows an embodiment of the buoyant body 4 with tail fins 7. When towing the streamer with the spacer element 5 and the buoyant body 4 in the towing direction 13, the buoyant body 4 will assume a position where the tail fins are located at the back. The tail fins 7 thus ensure that the buoyant body 4 maintains steady course and the water flow around the buoyant body is laminar. This adds to low drag and low acoustic noise.

Figure 7:
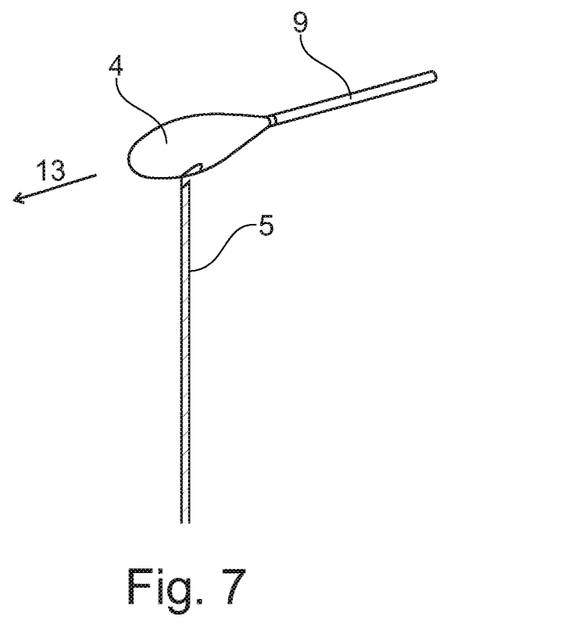
FIG. 7 shows the buoyant body with a tail.

FIG. 7 shows an embodiment of the buoyant body 4 with a tail 9. It has been found that the tail 9 will have approximately the same effect as tail fins 7 when towing. The tail 9 is, however, advantageous in that the buoyant bodies are lighter, smaller and less expensive to produce than if they have tail fins. The tail can be made of e.g. a hose, a tube or a strip of plastic.

To provide low acoustic noise the spacer elements may be provided with foil fairing, as discussed in the general part of the description.

Figure 8:
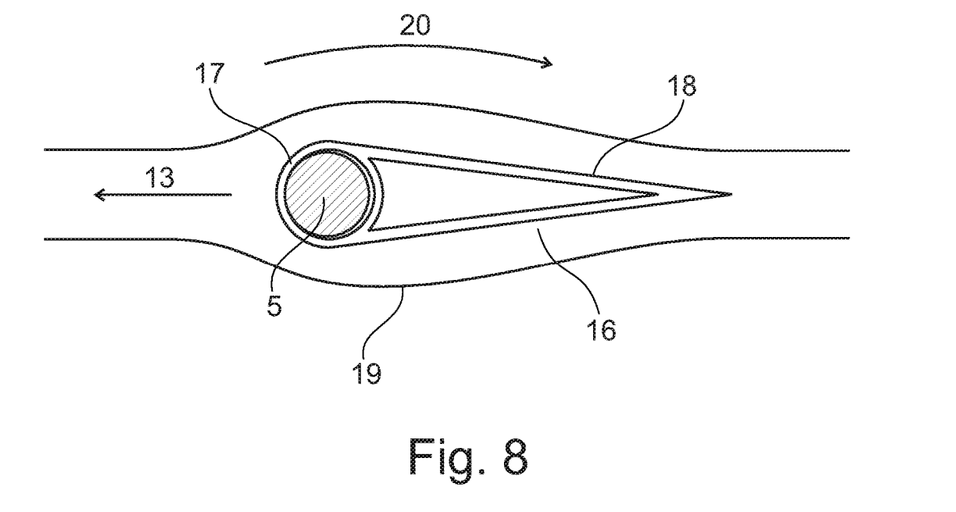
FIG. 8 shows, in a section taken along VIII-VIII in FIG. 6, a rope connecting the streamer and the buoyant body, fitted with foil fairing.

FIG. 8 shows, in a sectional view from below taken along VIII-VIII in FIG. 6, a spacer element 5 in the form of a rope, which in this embodiment is provided with foil fairing 16. The rope 5 with foil fairing moves in the towing direction 13, which in terms of flow is equivalent to a water flow 19 in a direction 20 relative to the rope 5. The foil fairing 16 consists of a tube portion 17 positioned around rope 5, and a fin portion 18 which forms a streamlined surface extending rearward from the tube portion 17, and that has sides that converge into a tip. The water flow 19 around the foil fairing 16 thus becomes much more laminar than it would have been around the rope 5 without foil fairing, and both drag and acoustic noise are lower than without foil fairing.

As an alternative to ropes the spacer elements may be formed by rigid or semi-rigid elements. Rigid elements may e.g. be rods of stainless steel or plastic, which may be stacked on the deck of the towing vessel before the streamer is deployed. Semi-rigid elements may e.g. be semi-rigid strips of plastic that can be wound on drums on deck at the towing vessel before the streamer is deployed. An advantage with that the spacer elements are rigid or semi-rigid could be that compared with ropes they are less likely to tangle with one another during storage prior to deployment of the streamer, and less likely to tangle up with the streamer during use.

The attachment devices 6 of the spacer elements for the streamer are in the illustrated embodiment formed by couplings which are connected to existing attachment devices. These existing attachment devices are formed by so-called "bird collars"—commonly used for attaching birds, "rescue buoys" and possibly other devices to the streamer.

It is preferred that the spacer elements for the buoyant bodies are connected to the streamer close to or at the birds, so that there is a short distance between upward forces from the buoyant bodies and downward forces from the birds. It is thereby avoided that the streamer meanders to any great extent because of the force couples formed by the forces from the buoyant bodies and the forces from the birds. It is further preferred that at least some of the spacer elements and the birds are attached in the same attachment devices, so that the force couple formed by the forces of the buoyant bodies and the forces of the birds is eliminated and accompanying meandering of the streamer completely avoided.

A desired negative buoyancy of the streamer including the birds is achieved by calculating and selecting the size of the ballast weights and/or the distance between the ballast weights along the streamer according to this. This can be calculated based on knowledge of the streamer. At least some of the ballast weights may be attached in the same attachment devices as the spacer elements. This may reduce the meandering of the streamer, similar to that explained above for attaching the spacer elements and the birds.

The invention claimed is:

1. A seismic streamer for underwater towing at a towing speed in ice-free or wholly or partially icy water, the streamer comprising:
   birds spaced along the seismic streamer, the streamer including the birds and any other equipment connected to the seismic streamer has negative buoyancy, the birds have adjustable wings that can be set so that the birds during movement in the water apply an upward or downward force on the seismic streamer; and
   buoyant bodies spaced along the seismic streamer configured for water to flow around the buoyant bodies during towing underwater, the buoyant bodies are connected to the seismic streamer by spacer elements, wherein the seismic streamer including the birds, the buoyant bodies with associated spacer elements and the any other equipment together have positive buoyancy so that when the streamer is stationary the seismic streamer rises towards the surface until the buoyant bodies reach the surface and the seismic streamer remains underwater by a length of the spacer elements to avoid damage to the seismic streamer from floating ice and avoid hydrostatic damage to the seismic streamer from sinking, and when the seismic streamer is moving through the water the birds submerge the buoyant bodies underwater, wherein the spacer elements are connected to the streamer close to or at the birds so that a force couple formed by forces of the buoyant bodies and forces of the birds is reduced and accompanying meandering of the seismic streamer is reduced.

2. The seismic streamer according to claim 1, wherein the spacer elements are provided with a foil.

3. The seismic streamer according to claim 1, wherein the spacer elements are formed by ropes.

4. The seismic streamer according to claim 1, wherein the spacer elements are formed by rigid or semi-rigid elements.

5. The seismic streamer according to claim 1, wherein the spacer elements are connected to the streamer by couplings that are connected to existing attachment devices.

6. The seismic streamer according to claim 1, wherein the streamer is provided with ballast weights spaced along the streamer, and at least some of the spacer elements and the ballast weights are attached in the same attachment devices.

7. The seismic streamer according to claim 1, wherein the buoyant bodies are designed with optimized hydrodynamic shape which gives small drag and low acoustic noise when towed underwater.

8. The seismic streamer according to claim 1, wherein the buoyant bodies have a tail for stabilizing the movement of the buoyant bodies when towed underwater.

9. The seismic streamer according to claim 1, wherein the spacer elements have a length of 2 to 6 meters.

10. A seismic streamer for underwater towing at a towing speed in ice-free or wholly or partially icy water, the streamer comprising:
    birds spaced along the seismic streamer, the streamer including the birds and any other equipment connected to the seismic streamer has negative buoyancy, the birds have adjustable wings that can be set so that the birds during movement in the water apply an upward or downward force on the seismic streamer; and
    buoyant bodies spaced along the seismic streamer configured for water to flow around the buoyant bodies during towing underwater, the buoyant bodies are connected to the seismic streamer by spacer elements, wherein the seismic streamer including the birds, the buoyant bodies with associated spacer elements and the any other equipment together have positive buoyancy so that when the streamer is stationary the seismic streamer rises towards the surface until the buoyant bodies reach the surface and the seismic streamer remains underwater by a length of the spacer elements to avoid damage to the seismic streamer from floating ice and avoid hydrostatic damage to the seismic streamer from sinking, and when the seismic streamer is moving through the water the birds submerge the buoyant bodies underwater, wherein at least some of the spacer elements and the birds are attached in the same attachment devices.

11. A method for securing a seismic streamer from damage at a substantial reduction or cessation of towing speed when towing underwater in ice-free or wholly or partially icy water, the streamer is provided with birds spaced along the seismic streamer, the seismic streamer including the birds has negative buoyancy, the birds have adjustable wings which can be set so that the birds during movement in the water apply an upward or downward force on the seismic streamer, comprising:
    providing the streamer with buoyant bodies spaced along the seismic streamer, the buoyant bodies are connected to the seismic streamer by spacer elements, such that the seismic streamer including the birds, the buoyant bodies with associated spacer elements and any other equipment, together have positive buoyancy; and
    towing the birds at a towing speed to maintain the seismic streamer at a selected depth and the buoyant bodies submerged, the birds apply a downward force on the seismic streamer, which compensates for the positive buoyancy, wherein at a substantial reduction or cessation of towing speed, the downward force on the seismic streamer from the birds ceases as a result of lack of movement in the water, and the seismic streamer including the birds, the buoyant bodies with associated spacer elements and any other equipment rise until the buoyant bodies reach an ice-free water surface or the underside of a wholly or partially icy water surface and the seismic streamer remains submerged below the ice-free water surface or the underside of the wholly or partially icy water surface, wherein the spacer elements are connected to the streamer close to or at the birds so that a force couple formed by forces of the buoyant bodies and forces of the birds is reduced and accompanying meandering of the seismic streamer is reduced.

12. The method according to claim 11, wherein the streamer including the birds is given negative buoyancy when ballasting the streamer.

13. The method according to claim 11, wherein a depth at which the streamer is hanging below the buoyant bodies is preselected by selecting the length of the spacer elements.

14. The method according to claims 11, wherein a precalculated total buoyancy of the buoyant bodies is achieved by changing displacement or volume weight of the buoyant bodies or by changing the number of buoyant bodies.

* * * * *